US006696136B2

(12) United States Patent
Baldwin

(10) Patent No.: US 6,696,136 B2
(45) Date of Patent: Feb. 24, 2004

(54) MOSAIC DECORATION HAVING A PLANAR SURFACE

(75) Inventor: Sara W. Baldwin, Cheriton, VA (US)

(73) Assignee: Sara Baldwin Design, Inc., Exmore, VA (US)

( * ) Notice: Subject to any disclaimer, the term of this patent is extended or adjusted under 35 U.S.C. 154(b) by 0 days.

(21) Appl. No.: 09/912,980

(22) Filed: Jul. 25, 2001

(65) Prior Publication Data

US 2003/0021936 A1 Jan. 30, 2003

(51) Int. Cl.[7] .................................................. B32B 3/10

(52) U.S. Cl. ......................... 428/172; 428/49; 428/174; 428/187; 428/48

(58) Field of Search .............................. 428/47, 48, 49, 428/172, 156, 187, 174; 52/311.2

(56) References Cited

U.S. PATENT DOCUMENTS 421,742 A * 2/1890 Marsh ......................... 428/49
3,097,080 A 7/1963 Weir
4,036,929 A 7/1977 Gould
4,466,937 A 8/1984 Johnston et al.
4,528,227 A 7/1985 Frechtmann
4,624,815 A 11/1986 Moufarrege
4,902,367 A 2/1990 Park et al.
4,912,850 A 4/1990 Gray
4,931,331 A 6/1990 Owens
4,993,984 A 2/1991 Matarese
5,904,886 A 5/1999 Stecker

FOREIGN PATENT DOCUMENTS

DE 3627091 A1 2/1988

* cited by examiner

*Primary Examiner*—Alexander S. Thomas
(74) *Attorney, Agent, or Firm*—Kaufman & Canoles

(57) ABSTRACT

The present invention provides methods for producing a detailed mosaic decoration with a planar top surface. Specifically, this invention provides a multi-level supporting surface or substrate such that a less detailed portion of the mosaic, made up of relatively thicker mosaic materials, is formed atop a base portion of the support substrate, while a more detailed portion of the mosaic, made up of the relatively thinner mosaic materials, is formed atop a raised portion of the support substrate. Thus, both the highly detailed portion of the mosaic, being formed of relatively thinner mosaic materials, and the less detailed portion of the mosaic, being formed of relatively thicker mosaic materials, appear as though they are formed from relatively thicker mosaic materials.

6 Claims, 8 Drawing Sheets

MOSAIC DECORATION HAVING A PLANAR SURFACE

BACKGROUND OF THE INVENTION

1. Field of the Invention

This invention relates generally to mosaics, and more specifically, to producing mosaic decorations having a planar surface.

2. Description of Related Art

Generally, mosaics are decorative objects made from various size pieces or fragments of a hard substance, such as, for example, terra cotta, glass, marble, or stone, selected and fitted together to form a desired design or image. Mosaics are not only found as independent pieces of art, but are also used to decorate architecture, ornament furniture, enhance jewelry, and adorn pots, boxes, vases, and the like.

The various pieces of material that comprise the mosaics, known as tesserae, are usually positioned on a supporting surface and held in place by some type of mortar. Thus, mosaics typically form a cracked or broken image because of the mortar lines that are created between the various pieces of the mosaic.

Typically, the amount of detail present in a particular piece of mosaic art is a function of the size of each piece of the mosaic, or tesserae, in relation to the overall size of the mosaic. For example, if the mosaic is relatively large, rather large, thick fragments may be used to produce a design or image with a relatively high degree of detail. Conversely, if the mosaic is relatively small, small fragments of the mosaic material must be used so that a high level of detail is maintained.

However, although mosaics with a high degree of detail are desirable, the costs associated with using thick pieces of mosaic tesserae and the intense amount of labor involved in producing a large, detailed mosaic make sizeable, detailed mosaics quite expensive.

SUMMARY OF THE INVENTION

Unfortunately, known methods for producing mosaics do not allow a mosaic to be produced that has a high-perceived value by virtue of its size and level of detail, but is cost effective to produce. Thus, the present invention provides methods for producing a detailed mosaic having different size mosaic tesserae in different areas of the mosaic, while maintaining a planar top surface. Specifically, this invention provides a multi-level supporting surface or substrate such that a highly detailed portion of a mosaic, being formed of generally smaller, thinner mosaic tesserae, and a less detailed portion of the mosaic, being formed of generally larger, thicker mosaic tesserae, can both appear as though they are formed of thick mosaic tesserae.

In the various exemplary embodiments of the methods for producing a detailed mosaic with a planar surface according to this invention, the less detailed portions of the mosaic, comprised of the larger, thicker mosaic tesserae, are formed atop a base portion (or a single layer) of the support substrate, while the more detailed portions of the mosaic, comprised of the smaller, thinner mosaic tesserae, are formed atop a raised portion (or a second layer) of the support substrate.

In one exemplary embodiment of this invention, a detailed and labor intensive central portion, or medallion, is first created. The central medallion is then surrounded by larger, thicker pieces of mosaic tesserae, which are generally larger, thicker, and less detailed, but coordinate and accentuate the central design.

In various exemplary embodiments of this invention, the mosaic tesserae are marble. However, it should be understood that the mosaic tesserae may be, for example, terra cotta, glass, stone, or any other material capable of being selected and fitted together to form a desired design or image.

In various exemplary embodiments, the central medallion is made of approximately ⅛" thick tesserae while the outer design is fabricated from tesserae that are approximately ⅜" thick. Because the thinner mosaic tesserae can be cut and shaped more easily and accurately, the material and labor costs associated with the creation of a detailed central medallion is reduced. The thicker outer portion of the mosaic reduces production time of the mosaic because fewer pieces make up each square foot. Furthermore, the thicker portions of the mosaic add strength to the mosaic and contribute to an overall appearance that the entire mosaic is formed of thick mosaic tesserae.

Accordingly, this invention provides a multi-level supporting substrate such that a highly detailed portion of a mosaic and a less detailed portion of the mosaic can both appear as though they are formed of thick mosaic tesserae.

This invention separately provides a mosaic wherein a highly detailed portion of a mosaic is formed of smaller, thinner mosaic tesserae, and a less detailed portion of the mosaic is formed of larger, thicker mosaic tesserae.

This invention separately provides methods for producing a detailed mosaic with a planar surface.

This invention separately provides methods for mounting sections of mosaic tesserae of different heights, or thicknesses, in a manner that allows the sections of mosaic tesserae to be flush on a top surface and appear to be the same height, or thickness.

This invention separately provides a mosaic wherein more detailed portions of the mosaic are formed atop raised portions of a support substrate, while less detailed portions are formed atop a base portion of the support substrate.

These and other features and advantages of this invention are described in or are apparent from the following detailed description of the exemplary embodiments, the accompanying drawings, and/or the appended claims.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF THE PREFERRED EMBODIMENT

For simplicity and clarification, the design factors and layout of the detailed mosaic having a planar surface according to this invention are explained with reference to an exemplary embodiment of a mosaic decoration having a planar surface according to this invention. The basic explanation of the mosaic decoration having a planar surface is applicable for the understanding and design of the constituent components employed in the mosaic decoration having a planar surface of this invention.

Furthermore, for simplicity and clarification, the various exemplary embodiments of this invention will be described with reference to a mosaic decoration having a detailed central medallion. However, it should be appreciated that the terms "central medallion" and "medallion" are for a basic explanation and understanding of certain of the constituent components of the mosaic of this invention. Therefore, the terms "central medallion" and "medallion" are not to be construed as limiting this invention, but should be understood to represent portions of a mosaic decoration that feature increased detail when compared with at least one other portion of the mosaic.

It should be further understood that although the "medallion" shown in the included drawing figures includes a specific floral design, the "medallion" shown in the included drawing figures is merely exemplary. The "medallion" may comprise any one of an infinite number and/or combination of images, designs, shapes, colors, or the like that may be appear in a mosaic form that features at least one area having increased detail when compared with at least one other area of the mosaic. Likewise, although the mosaic decoration shown in the included drawing figures has a particular shape and design, the mosaic decoration shown is merely one of an infinite number of sizes and shapes that a mosaic decoration may take.

Furthermore, the shape, relative size, and placement of the "medallion", as well as the design of the remaining portion (s) of the mosaic decoration in the included drawing figures is for a basic explanation and understanding of certain of the constituent components of the mosaic decoration of this invention and is not to be construed as limiting this invention.

Figure 1A:
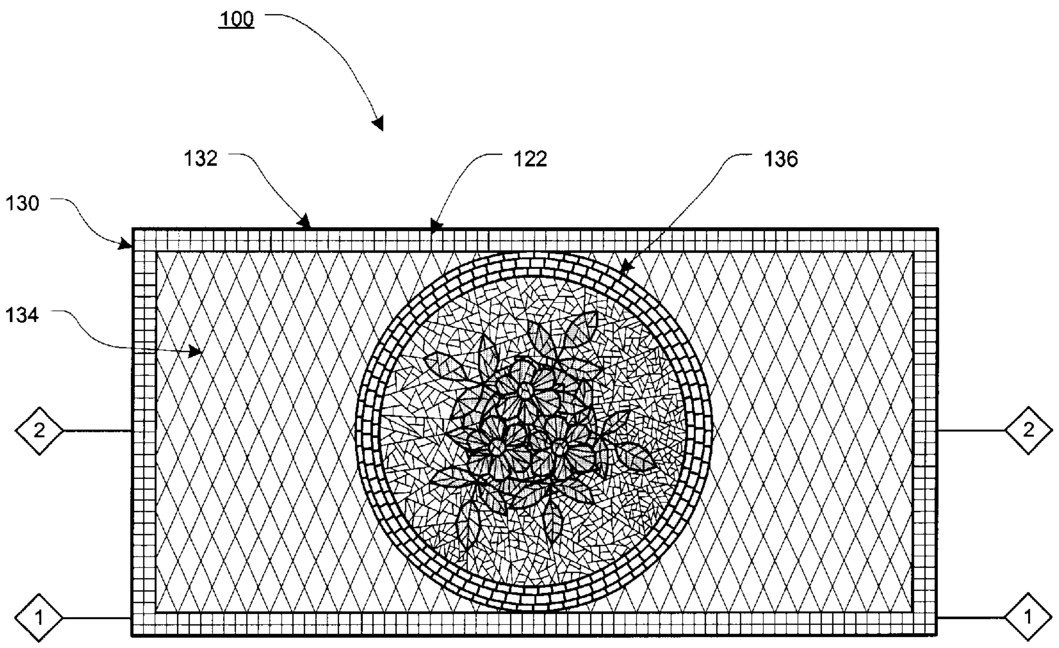
Fig. 1A PRIOR ART
FIG. 1A is a plan view of a top side of a first exemplary embodiment of a mosaic decoration constructed using known methods for producing a planar surface.
Figure 1B:
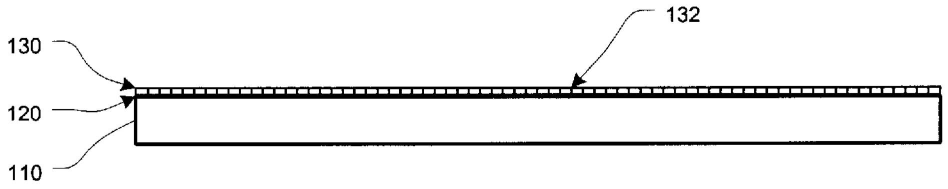
Fig. 1B PRIOR ART
FIG. 1B is a schematic cross-sectional view taken along line 1—1 of the mosaic decoration of FIG. 1A.
Figure 1C:
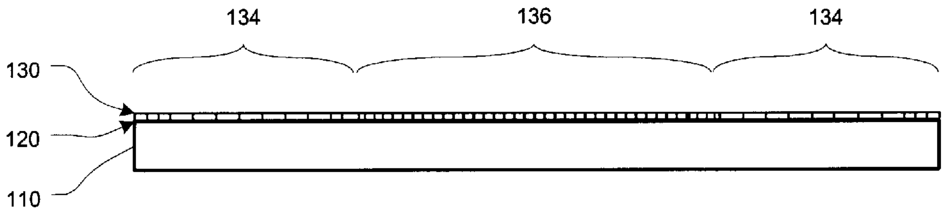
Fig. 1C PRIOR ART
FIG. 1C is a schematic cross-sectional view taken along line 2—2 of the mosaic decoration of FIG. 1A.

FIGS. 1A, 1B, and 1C show a first exemplary embodiment of a mosaic decoration 100 constructed using known methods for producing a planar mosaic surface. Specifically, FIG. 1A shows a plan view of a top side of the mosaic decoration 100 while FIGS. 1B and 1C show cross-sectional views taken along line 1—1 and line 2—2, respectively, of the mosaic decoration 100 of FIG. 1A.

As shown in FIGS. 1A–C, the mosaic decoration 100 includes a substrate layer 110, a mortar layer 120, and a tesserae layer 130. A mosaic design is formed in the tesserae layer 130 by first placing a certain amount of mortar 122 atop the substrate layer 110. In this manner, a mortar layer 120 is formed atop the substrate layer 110. Numerous pieces of material, such as pieces of individual mosaic tesserae 132, are then placed atop the mortar layer 120 to form a desired image or pattern. An additional amount of mortar 122 is typically placed between each mosaic tesserae 132 to ensure that each mosaic tesserae 132 remains in place.

As shown in FIGS. 1A and 1C, the mosaic decoration 100 comprises an outer portion 134 and a central medallion 136. The outer portion 134 does not contain a significant amount of detail. However, as shown in FIG. 1A, the central medallion 136 contains a relatively detailed floral design.

In order to efficiently and cost effectively reproduce the detailed floral design in the central medallion 136, known methods dictate that each mosaic tesserae 132 must be relatively thin. Thus, in order to produce a planar top surface of the tesserae layer 130 using known methods, the height, or thickness, of each mosaic tesserae 132 must be approximately the same. However, when each piece of mosaic tesserae 132 is relatively thin, the mosaic tesserae 132, especially the mosaic tesserae 132 in the outer portion 134, are easily broken.

Figure 2A:
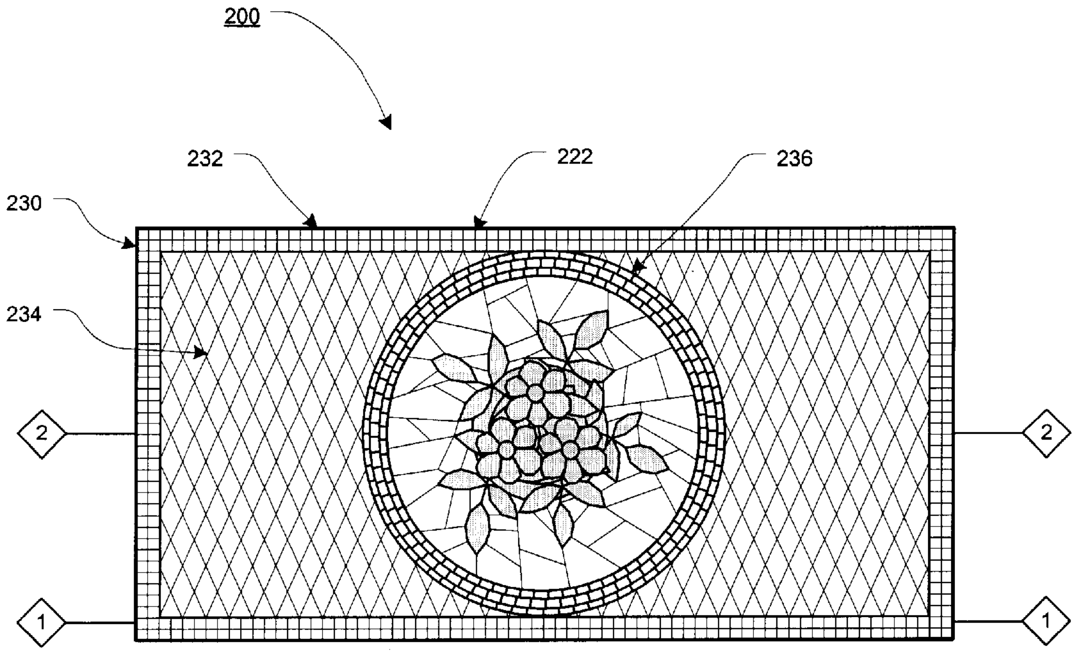
Fig. 2A PRIOR ART
FIG. 2A is a plan view of a top side of a second exemplary embodiment of a mosaic decoration constructed using known methods for producing a planar mosaic surface.
Figure 2B:
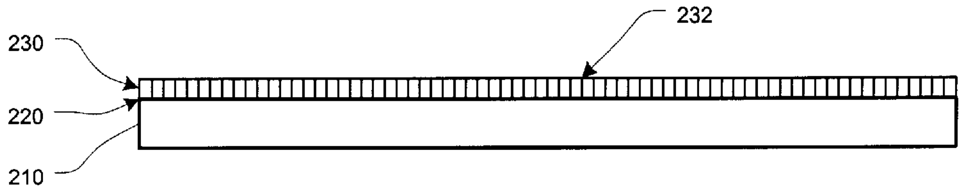
Fig. 2B PRIOR ART
FIG. 2B is a schematic cross-sectional view taken along line 1—1 of the mosaic decoration of FIG. 2A.
Figure 2C:
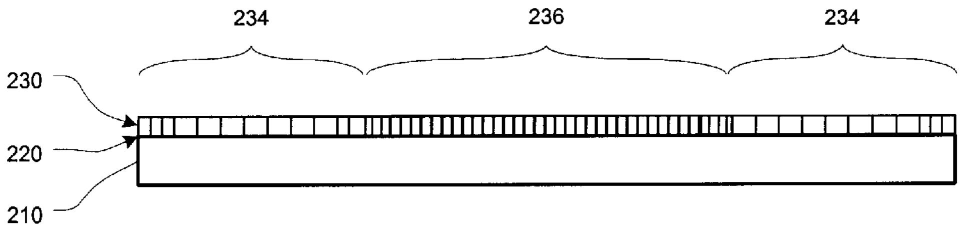
Fig. 2C PRIOR ART
FIG. 2C is a schematic cross-sectional view taken along line 2—2 of the mosaic decoration of FIG. 2A.

FIGS. 2A, 2B, and 2C show a second exemplary embodiment of a mosaic decoration 200 constructed using known methods for producing a planar mosaic surface. Specifically, FIG. 2A shows a plan view of a top side of the mosaic decoration 200 while FIGS. 2B and 2C show cross-sectional views taken along line 1—1 and line 2—2, respectively, of the mosaic decoration 200 of FIG. 2A.

As shown in FIGS. 2A–C, the mosaic decoration 200 includes a substrate layer 210, a mortar layer 220, mortar 222, a tesserae layer 230, individual mosaic tesserae 232, an outer portion 234, and a central medallion 236. These elements correspond to similarly numbered elements described above, with reference to FIGS. 1A–1C.

However, as shown in FIGS. 2A–2C, each of the individual mosaic tesserae 232 is thicker than the mosaic tesserae 132 of FIGS. 1A–1C. Although the thicker mosaic tesserae 232 in the mosaic 200 are less likely to break, the thicker mosaic tesserae 232 are not as easily broken or cut into small pieces. Therefore, much of the detail in the floral design of the central medallion 136, as shown in FIGS. 1A–1C, cannot be efficiently reproduced in the central medallion 236.

Figure 3A:
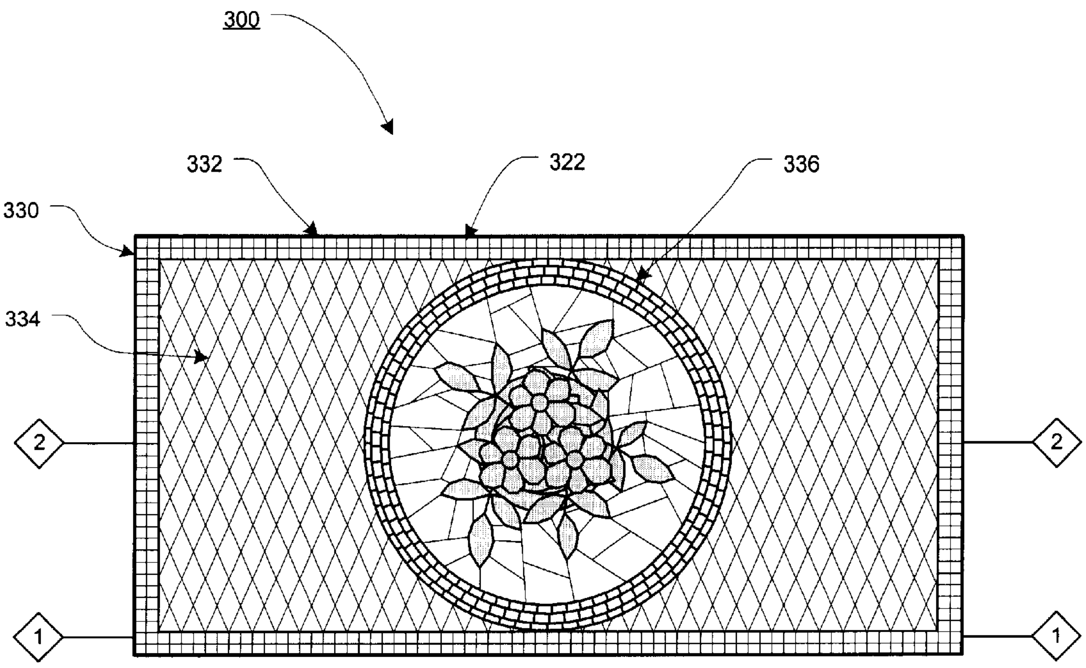
Fig. 3A PRIOR ART
FIG. 3A is a plan view of a top side of a third exemplary embodiment of a mosaic decoration constructed using known methods for producing a planar mosaic surface.
Figure 3B:
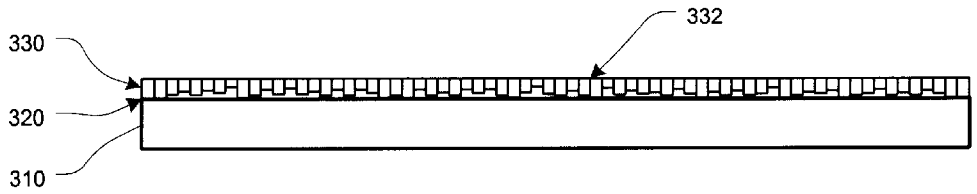
Fig. 3B PRIOR ART
FIG. 3B is a schematic cross-sectional view taken along line 1—1 of the mosaic decoration of FIG. 3A.
Figure 3C:
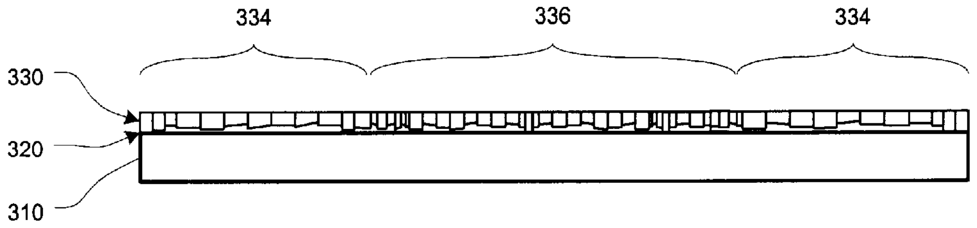
Fig. 3C PRIOR ART
FIG. 3C is a schematic cross-sectional view taken along line 2—2 of the mosaic decoration of FIG. 3A.

FIGS. 3A, 3B, and 3C show a third exemplary embodiment of a mosaic decoration 300 constructed using known methods for producing a planar mosaic surface. Specifically, FIG. 3A shows a plan view of a top side of the mosaic decoration 300 while FIGS. 3B and 3C show cross-sectional views taken along line 1—1 and line 2—2, respectively, of the mosaic decoration 300 of FIG. 3A.

As shown in FIGS. 3A–C, the mosaic decoration 300 includes a substrate layer 310, a mortar layer 320, mortar 322, a tesserae layer 330, individual mosaic tesserae 332, an outer portion 334, and a central medallion 336. These elements correspond to similarly numbered elements described above, with reference to FIGS. 1A–1C and 2A–2C.

However, as shown in FIGS. 3A–3C, the individual mosaic tesserae 332 are not of a uniform height. Mosaic tesserae 332 of differing heights are typically made to appear flush on a top surface of a mosaic by first, creating the tesserae layer 330 on a front facing sheet of fabric, paper, or plastic. This is accomplished by temporarily adhering the top surface of the mosaic tesserae 332 to the front facing sheet. Then, a thick layer of mortar 322 is applied to the top surface of the substrate layer 310 to form the mortar layer 320. Once the mortar 322 has been applied, the bottom side of the tesserae layer 330, while still adhered to the front facing, is pressed into the mortar layer 320 until all of the mosaic tesserae 332 have made at least some contact with the mortar layer 320.

A flat object is often used to press the tesserae layer 330 into the mortar layer 320. Thus, although the mosaic tesserae 332 are of differing heights, the thick mortar layer 320 fills in the gaps between the substrate layer 310 and the tesserae layer 330 so that a relatively planar surface is achieved on the top of the mosaic decoration 300.

Although this method allows smaller, thinner pieces of mosaic tesserae 332 to be used to form the tesserae layer 330 and much of the detail in the floral design to be reproduced in the central medallion 336, one of the disadvantages of this method is that, as the tesserae layer 330 is pressed into the thick mortar layer 320, a fair amount of mortar 322 flows between the mosaic tesserae 332 and adheres to the front facing. Because the front facing is not removed until after the mortar 322 has dried, this method requires that a large amount of cleaning be done to remove the excess mortar 322 that accumulates on the top surface of the mosaic decoration 300. Furthermore, when small, thin pieces of mosaic tesserae 332 are used, such as, for example, in the area of the central medallion 336, this method is quite impractical and clumsy.

Figure 4A:
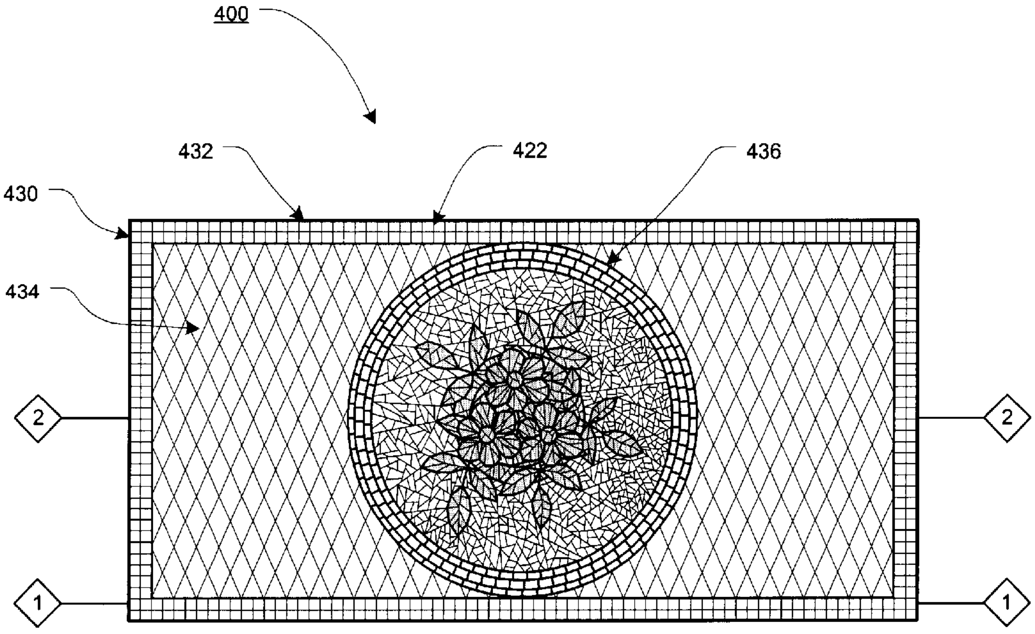
FIG. 4A is a plan view of a top side of a first exemplary embodiment of a mosaic decoration with a planar mosaic surface constructed according to the methods of this invention.
Figure 4B:
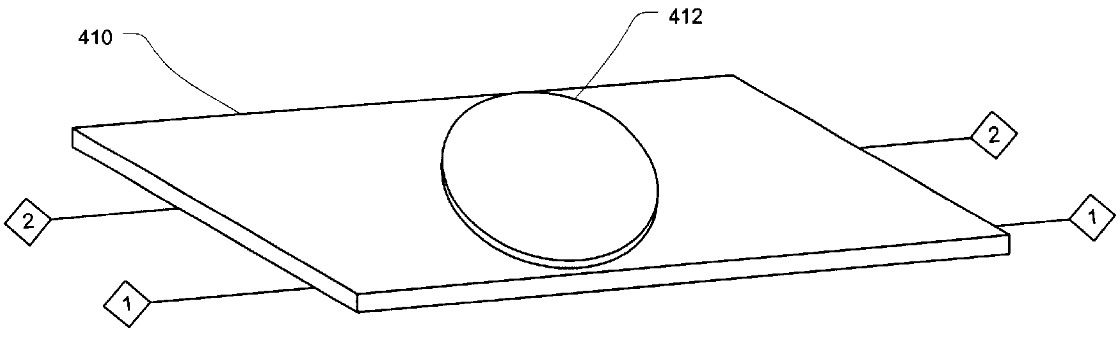
FIG. 4B is a perspective view showing the substrates used as a base for the mosaic decoration of FIG. 4A.
Figure 4C:
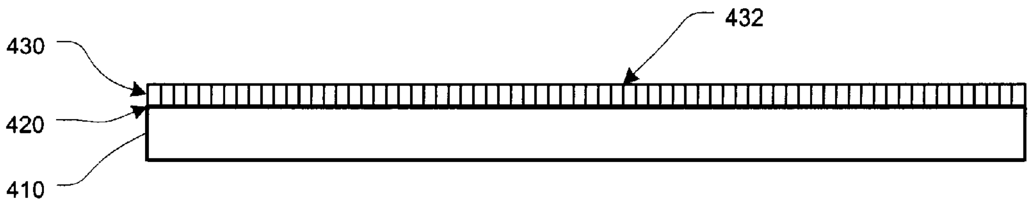
FIG. 4C is a schematic cross-sectional view taken along line 1—1 of the mosaic decoration of FIG. 4A.
Figure 4D:
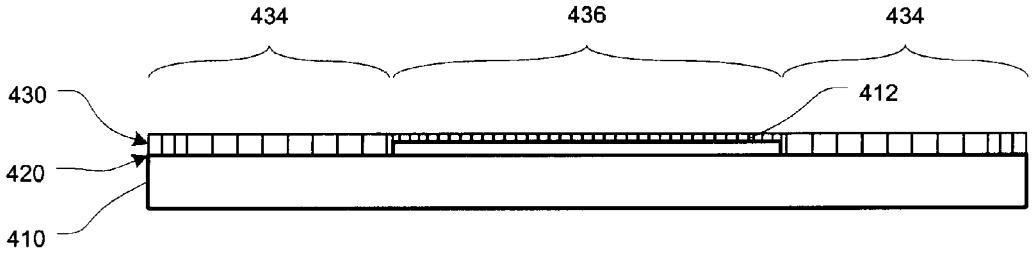
FIG. 4D is a schematic cross-sectional view taken along line 2—2 of the mosaic decoration of FIG. 4A.

FIGS. 4A, 4B, 4C, and 4D show a first exemplary embodiment of a mosaic decoration 400 with a planar surface constructed according to the methods of this invention. Specifically, FIG. 4A shows a plan view of a top side of the mosaic decoration 400, FIG. 4B shows a perspective view of the substrates used as a base for the mosaic decoration of FIG. 4A, and FIGS. 4C and 4D show cross-sectional views taken along line 1—1 and line 2—2, respectively, of the mosaic decoration 400 of FIG. 4A.

As shown in FIGS. 4A–D, the mosaic decoration 400 includes a base substrate layer 410, a secondary substrate layer 412, a mortar layer 420, and a tesserae layer 430. In various exemplary embodiments, the base substrate layer 410 and the secondary substrate layer 412 are comprised of a material with a coefficient of expansion substantially similar to the coefficient of expansion of the materials that make up the tesserae layer 430. In various exemplary embodiments, the base substrate layer 410 and the secondary substrate layer 412 are made of Baltek®, which is produced by Baltek Corporation.

The mortar layer 420 is formed atop the base substrate layer 410 and the secondary substrate layer 412 by placing a certain amount of mortar 422, such as, for example an adhesive, cement, epoxy, acrylic, grout, or the like, atop the base substrate layer 410 and the secondary substrate layer 412.

The tesserae layer 430 is made of numerous pieces of mosaic tesserae 432. In various exemplary embodiments, the pieces of mosaic tesserae 432 are, for example, terra cotta, glass, marble, or stone. It should be appreciated that appropriate materials for the base substrate layer 410, the secondary substrate layer 412, the mortar layer 420, and the tesserae layer 430 are selected based on the desired appearance of the mosaic decoration 400 as well as the conditions that are expected to occur during use of the mosaic decoration 400.

As shown in FIGS. 4A and 4D, the mosaic decoration 400 includes both an outer portion 434 and a central medallion 436. The outer portion 434 does not contain a significant amount of detail and, therefore, can be made of relatively large, thick pieces of mosaic tesserae 432. Because the outer portion 434 is constructed of relatively large, thick pieces of mosaic tesserae 432, the outer portion 434 is located in an area of the mosaic decoration 400 that is supported by the base substrate layer 410 and not the secondary substrate layer 412. In various exemplary embodiments, the pieces of mosaic tesserae 432 that make up the outer portion 434 are approximately ⅜" thick.

As further shown in FIG. 4A, the mosaic decoration also includes a central medallion 436. The central medallion 436 contains a relatively detailed floral design and, therefore, must be made of relatively small pieces of mosaic tesserae 432. Because the central medallion 436 is constructed of relatively small pieces of mosaic tesserae 432, the central medallion 436 is located in an area of the mosaic decoration 400 that is supported by both the base substrate layer 410 and the secondary substrate layer 412. In this manner, although the central medallion 436 is made of relatively small pieces of mosaic tesserae 432, the relatively small pieces of mosaic tesserae 432 that make up the central medallion 436 appear to be of the same thickness as the mosaic tesserae 432 that make up the outer portion 434, by virtue of their placement atop the secondary substrate layer 412. In various exemplary embodiments, the pieces of mosaic tesserae 432 that make up the central medallion 436 are approximately ⅛" thick.

It should be appreciated that, in order to produce a generally planar surface on the top side of the mosaic decoration 400, the secondary substrate layer 412 has a height, or thickness, that is approximately equal to the difference between the height, or thickness, of the pieces of mosaic tesserae 432 that make up the outer portion 434 and the height, or thickness, of the pieces of mosaic tesserae 432 that make up the central medallion 436. Thus, for example, if the pieces of mosaic tesserae 432 that make up the outer portion 434 have a thickness of approximately ⅜" and the pieces of mosaic tesserae 432 that make up the central medallion 436 have a thickness of approximately ⅛", the secondary substrate layer 412 will have a thickness of approximately ¼".

In order to produce the mosaic decoration 400 with a generally planar top surface, the base substrate layer 410 is first provided. Then, a bottom side of the secondary substrate layer 412, in the shape of the central medallion 436, is affixed to the center of the base substrate layer 410 on a top side thereof. Next, a portion of the mortar layer 420 is applied to a top side of the secondary substrate layer 412.

Once the portion of the mortar layer 420 has been applied to the top side of the secondary substrate layer 412, the pieces of mosaic tesserae 432 that make up the central medallion 436 are affixed to a top side of the mortar layer 420 on the secondary substrate layer 412. In various exemplary embodiments, an additional amount of mortar 422 is placed between each mosaic tesserae 432 to ensure that each mosaic tesserae 432 remains in the proper place. It should be appreciated that the additional amount of mortar 422 may comprise grout, unsanded grout, mortar, cement, epoxy, acrylic, or the like.

It should be understood that smaller, thinner pieces of mosaic tesserae 432 are selected and fitted together to form the detailed floral design that makes up the central medallion 436. It should be appreciated that since the pieces of mosaic tesserae 432 that make up the central medallion 436 are relatively thin, the mosaic tesserae 432 can be, for example, hand cut into small shapes to provide enhanced detail to the design in the central medallion 436.

When the detailed floral design in the central medallion 436 is completed, a portion of the mortar layer 420 is applied to a top side of the base substrate layer 410 in the outer portion 434. Once the remaining portion of the mortar layer 420 has been applied, the pieces of mosaic tesserae 432 that make up the outer portion 434 are affixed to a top side of the mortar layer 420 on the base substrate layer 410. In various exemplary embodiments, an additional amount of mortar 422 is placed between each mosaic tesserae 432 to ensure that each mosaic tesserae 432 remains in the proper place. It should be understood that larger, thicker pieces of mosaic tesserae 432 are selected and fitted together to form the design that makes up the outer portion 434.

Because the smaller, thinner mosaic tesserae 432 are affixed atop the secondary substrate layer 412 and the larger, thicker mosaic tesserae 432 are affixed atop the base substrate layer 410, a generally planar surface is produced on the top side of the mosaic decoration 400.

Figure 5A:
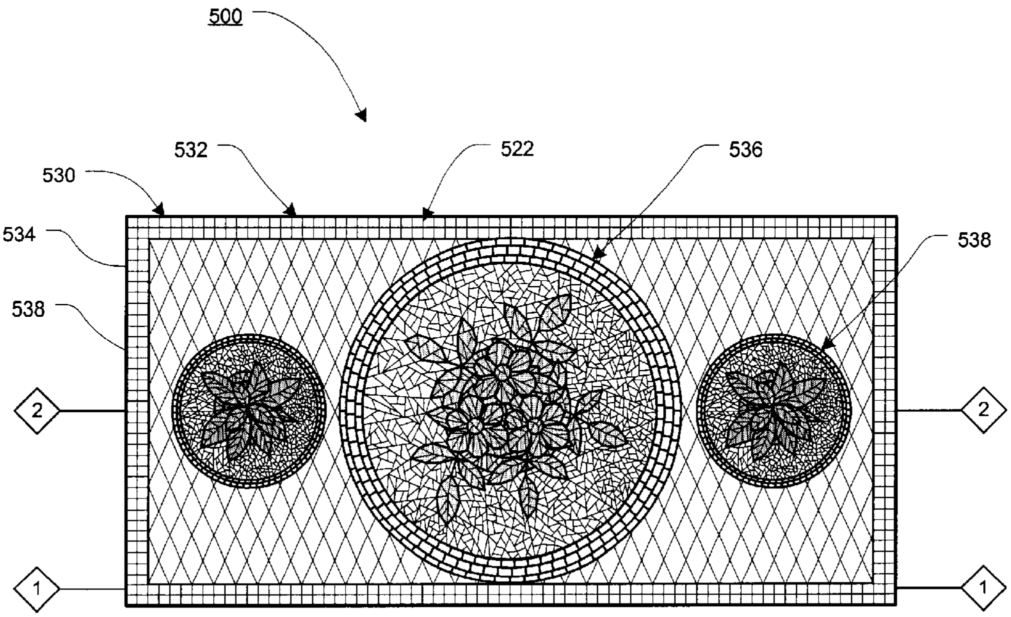
FIG. 5A is a plan view of a top side of a second exemplary embodiment of a mosaic decoration with a planar mosaic surface constructed according to the methods of this invention.
Figure 5B:
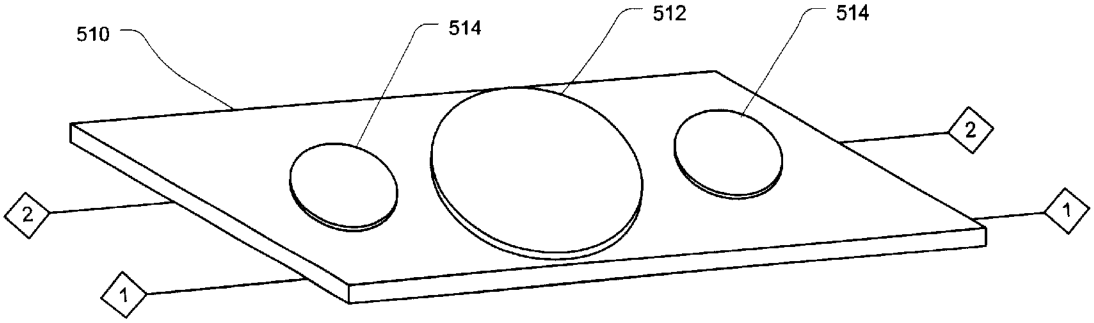
FIG. 5B is a perspective view showing the substrates used as a base for the mosaic decoration of FIG. 5A.
Figure 5C:
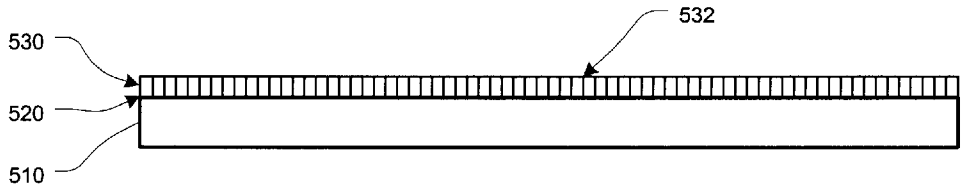
FIG. 5C is a schematic cross-sectional view taken along line 1—1 of the mosaic decoration of FIG. 5A.
Figure 5D:
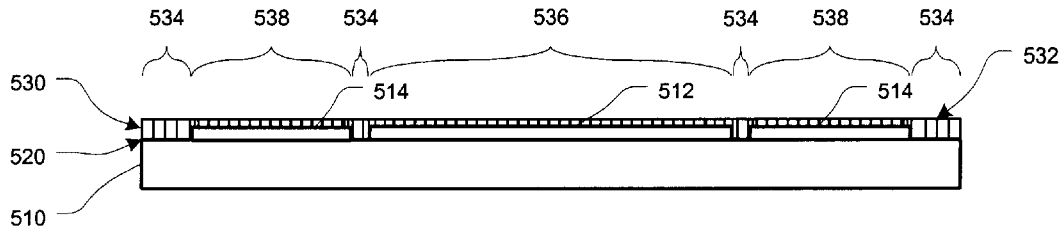
FIG. 5D is a schematic cross-sectional view taken along line 2—2 of the mosaic decoration of FIG. 5A.

FIGS. 5A, 5B, 5C, and 5D show a first exemplary embodiment of a mosaic decoration 500 with a planar surface constructed according to the methods of this invention. Specifically, FIG. 5A shows a plan view of a top side of the mosaic decoration 500, FIG. 5B shows a perspective view of the substrates used as a base for the mosaic decoration of FIG. 5A, and FIGS. 5C and 5D show cross-sectional views taken along line 1—1 and line 2—2, respectively, of the mosaic decoration 500 of FIG. 5A.

As shown in FIGS. 5A–D, the mosaic decoration 500 includes a base substrate layer 510, a secondary substrate layer 512, a mortar layer 520, mortar 522, a tesserae layer 530, an outer portion 534, and a central medallion 536. These elements correspond to similarly numbered elements described above, with reference to FIGS. 4A–4C.

However, as shown in FIGS. 5A–5D, the mosaic decoration 500 also includes two additional substrate layers 514. The additional substrate layers 514 provide the same benefit as the secondary substrate layer 512. However, the additional substrate layers 514 allow areas of greater detail to be included in various areas of the mosaic decoration 500 in addition to the central medallion 536.

Figure 6:
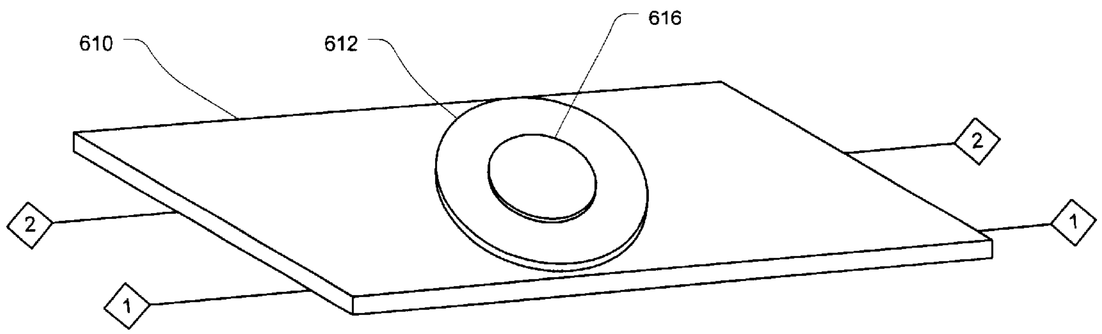
FIG. 6 is a perspective view showing the substrates useable as a base for a third exemplary embodiment of a mosaic decoration with a planar mosaic surface constructed according to the methods of this invention.

FIG. 6 shows a perspective view of an exemplary embodiment of a multi-level base substrate 600 useable as a base for a third exemplary embodiment of a mosaic decoration with a planar mosaic surface constructed according to the methods of this invention. The multi-level base substrate 600 includes a base substrate layer 610 and a secondary substrate layer 612. These elements correspond to similarly numbered elements described above, with reference to FIGS. 4A–4D and 5A–5D.

However, the multi-level base substrate 600 also includes a supplementary substrate layer 616. The supplementary substrate layer 616 allows a mosaic decoration (not shown) to be formed atop the multi-level base substrate 600 with three levels of detail. Thus, the mosaic decoration (not shown) may include a relatively undetailed portion affixed atop an exposed portion of the base substrate layer 610, a more detailed portion affixed atop an exposed portion of the secondary substrate layer 612, and a highly detailed portion affixed atop the supplementary substrate layer 616.

It should be appreciated that the height, or thickness, of each of the base substrate layer 610, the secondary substrate layer 612, and the supplementary substrate layer 616 is a function of the difference between the thickness of the thickest pieces of mosaic tesserae used and the thickness of the mosaic tesserae used atop the secondary substrate layer 612 and the supplementary substrate layer 616.

It should be understood that additional substrate levels may be added to produce a mosaic with additional levels of detail. Furthermore, a supplementary substrate layer similar to the supplementary substrate layer 616 may be used in combination with the mosaic decoration 400, of FIGS. 4A–4D or the mosaic decoration 500, of FIGS. 5A–5D.

It should also be appreciated that although the mosaic decoration of this invention have been depicted and described with reference to a relatively detailed floral design surrounded by a less detailed field, the design depicted in the drawing figures and described herein is merely exemplary and does not limit this invention.

Likewise, it should also be appreciated that while the secondary substrate layer, the additional substrate layers, and the supplementary substrate layer have been described as being adhered or affixed to the base substrate layer, any of the secondary substrate layer, the additional substrate layers, and/or the supplementary substrate layer may be carved, formed, or molded as an integral part of the base substrate layer.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A mosaic having at least one portion containing a more detailed design as compared to another portion of the mosaic, wherein a less detailed portion of the mosaic is affixed to a base portion of a substrate and the more detailed portion of the mosaic is affixed to an elevated portion of the substrate such that the combination of relatively thinner pieces of mosaic material used in the more detailed portion of the mosaic and relatively thicker pieces of mosaic material used in the less detailed portion of the mosaic produces a generally planar surface.

2. A base substrate supporting a mosaic design such that a top surface of the mosaic design is generally planar, comprising:

a multi-level base substrate, wherein the multi-level base substrate includes at least one primary substrate portion supporting mosaic materials of a first height and at least one elevated substrate portion supporting mosaic materials of a second height, and wherein the mosaic materials of the first height are thicker than the mosaic materials of the second height.

3. The base substrate of claim 2, wherein the mosaic materials of the first height comprise a less detailed portion of the mosaic design and the mosaic materials of the second height comprise a more detailed portion of the mosaic design.

4. The base substrate of claim 2, wherein the at least one elevated substrate portion is affixed to the at least one primary substrate portion.

5. The base substrate of claim 2, wherein the at least one elevated substrate portion is an integral part of the at least one primary substrate portion.

6. The base substrate of claim 2, wherein the multi-level base substrate comprises a material with a coefficient of expansion substantially similar to the coefficient of expansion of the mosaic materials.

* * * * *